United States Patent Office 3,242,150
Patented Mar. 22, 1966

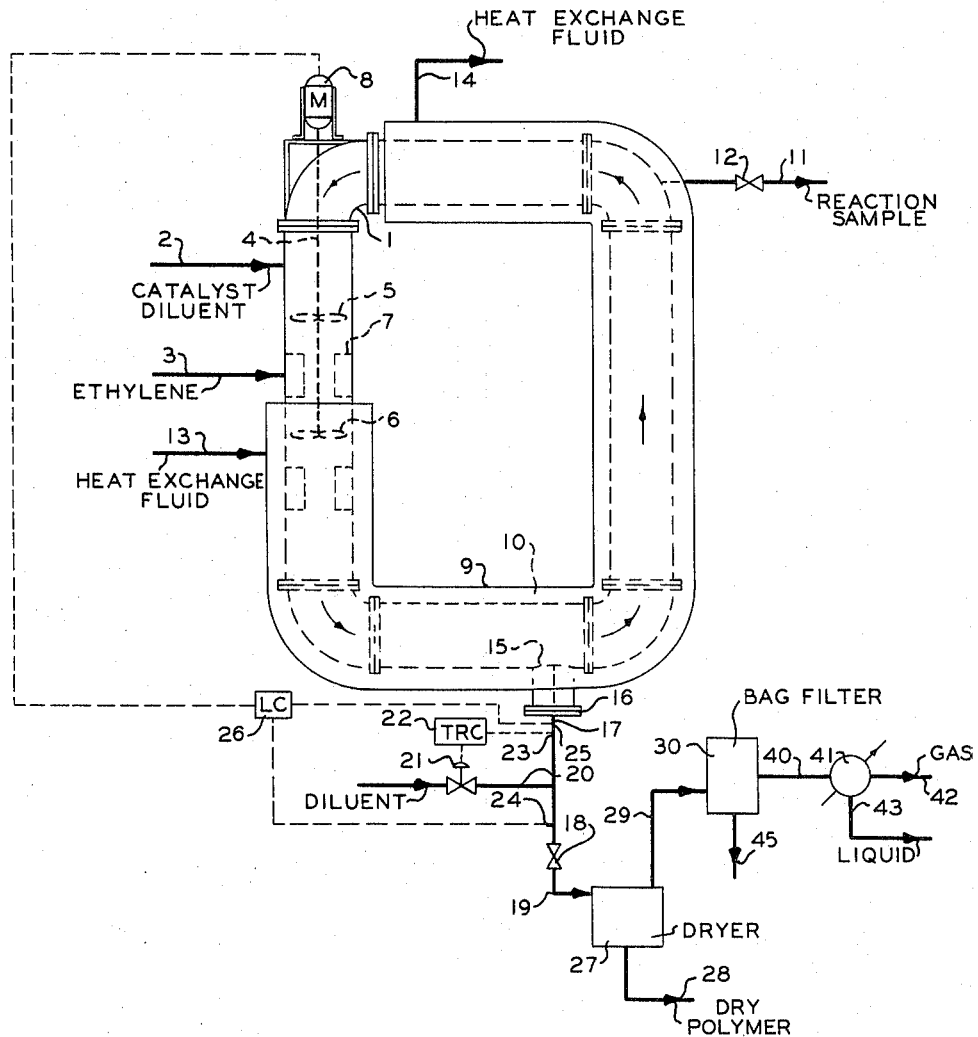

3,242,150
METHOD AND APPARATUS FOR THE RECOVERY OF SOLID OLEFIN POLYMER FROM A CONTINUOUS PATH REACTION ZONE
Jack S. Scoggin, Bartlesville, Okla., assignor to Phillips Petroleum Company, a corporation of Delaware
Filed Mar. 31, 1960, Ser. No. 19,007
21 Claims. (Cl. 260—88.2)

This invention relates to the recovery of olefin polymers from hydrocarbon slurries thereof. In one aspect, the invention relates to improved methods and apparatus for recovering particulate olefin polymers from continuous path reactors.

One method of carrying out particle form polymerization of ethylene and mixtures of ethylene with other unsaturated hydrocarbons is described in the copending application of Donald D. Norwood, Serial No. 819,391, filed June 10, 1959, now abandoned. In this copending application a method and apparatus is described for reducing the fouling of reaction surfaces by carrying out the polymerization reaction in a tubular closed loop reaction zone with smooth surfaces. The catalyst, liquid diluent and hydrocarbon reactants are continuously moved through the reaction zone at a velocity in the highly turbulent flow range thereby producing a solid particle form polymer product which is then withdrawn from the reaction zone. Means are disclosed therein for converting the rotational energy of the propellers into flow energy with a minimum loss of energy.

This invention represents an improvement on the aforementioned copending application of Norwood. A major consideration in the effiicent operation of a continuous path loop reactor is the removal of the product from the reactor. Prior methods of removal of the product require the simultaneous removal of large quantities of diluent and reactants which then need to be separated from the product and processed for return to the reactor.

It is an object of this invention to provide an improved method and apparatus for recovering high molecular weight, solid particulate form polymers from a hydrocarbon slurry thereof.

It is another object of this invention to provide an improved method and apparatus for recovering high molecular weight, solid particulate form polymers from a hydrocarbon slurry thereof from a continuous path loop reactor.

It is another object of this invention to provide an improved method and apparatus for curtailing further polymerization of the reactants removed from the reactor with the polymer product.

These and other objects of the invention will become more readily apparent from the following detailed description and discussion.

The foregoing objects are realized broadly by carrying out the polymerization reaction in a tubular closed loop reaction zone with smooth surfaces; liquid diluent and hydrocarbon reactants being continuously moved through said zone at a velocity in the highly turbulent flow range; the produced polymer being permitted to gravitate from said reaction zone into a receiving zone thereby collecting a fraction concentrated in particulate solid polymer product and solid particle form product being withdrawn from said receiving zone.

In one aspect of the invention a diluent is introduced into the receiving zone to maintain the temperature of the recovered polymer product below its softening point thereby reducing the possibility of fusion of the polymer and thereby eliminating plugging and fouling of the receiving zone.

In another aspect of the invention the velocity of the reactants within the loop reaction zone is varied proportionally to the quantity of particulate solids in the receiving zone.

It is disclosed in Hogan et al., U.S. Patent 2,825,721, that polymers and copolymers can be produced by contacting one or more olefins with a catalyst comprising as an essential ingredient chromium oxide, preferably including a substantial amount of hexavalent chromium. The chromium oxide is associated with at least one other oxide particularly selected from the group consisting of silica, alumina, zirconia and thoria. The olefin feed used for the polymerization is at least one olefin selected from 1-olefins having a maximum of 8 carbon atoms per molecule and no branching nearer the double bond than the 4-position. Examples of olefins which can be polymerized by the described method include ethylene, propylene, 1-butene, 1-pentene and 1,3-butadiene. Copolymers, such as ethylene-propylene copolymers and ethylene-butadiene copolymers, can also be prepared by utilizing the chromium oxide containing catalyst. The olefins are polymerized in the presence of a hydrocarbon diluent, for example, an acyclic, alicyclic or aromatic compound which is inert.

Recently it has been discovered that there is a critical polymerization temperature range within the broad range disclosed by Hogan et al. in which it is possible to produce increased yields of high molecular weight polymers of ethylene which are insoluble in the hydrocarbon diluent. This polymer is formed in association with the polymerization catalyst and is suspended in the liquid diluent in solid particle form. The preparation of insoluble particle form polymer is disclosed in the copending application of Leatherman et al., Serial No. 590,567, filed June 11, 1956. In the following discussion the term "particle form polymer" will be employed to designate the insoluble polymers of ethylene formed in accordance with the Leatherman et al. application.

Particle form polymer can be prepared from ethylene and from mixtures of ethylene with other unsaturated hydrocarbons, for example, mixtures of ethylene with minor amounts of higher 1-olefins, such as propylene, 1-butene, 1-pentane, 1-hexene, and the like. Examples of comonomers which can be used with ethylene include 1-olefins having no branching nearer the double bond than the 4-position and conjugated and non-conjugated diolefins. The polymerization reaction is carried out in the presence of a liquid hydrocarbon diluent which is inert in the polymerization reaction and in which the majority of the polymer is insoluble under reaction conditions. Suitable diluents include paraffins such as those having from 3 to 12 and preferably 3 to 8 carbon atoms per molecule, for example, n-butane, n-pentane, isopentane, n-hexane, n-decane, etc., saturated cyclic hydrocarbons such as cyclohexane, cyclopentane and methylcyclopentane, methylcyclohexane, etc. The polymerization reaction temperature will vary depending on the particular liquid diluent which is employed and on the olefin reactants. Usually, however, polymerization is carried out at 230° F. and below, preferably between about 225° F. and about 150° F. The olefin reactants are contacted in the polymerization zone with a suspension of subdivided chromium oxide catalyst in the liquid hydrocarbon diluent under the aforementioned temperatures and under pressures suitable to maintain the diluent in the liquid phase. Concentration of the catalyst in the reaction zone can vary widely; however, generally it will be in the range of 0.001 to 5 percent by weight based on the liquid hydrocarbon diluent. For a more detailed description of the polymerization process including reaction conditions, catalyst, etc., reference can be had to the copending application of Leatherman et al., Serial No. 590,567, filed June 11, 1956, now abandoned.

By the method and apparatus of this invention the polymer product may be continuously recovered from the loop reactor with a minimum of accompanying liquid diluent and hydrocarbon reactants. This minimizes the need for the recycling of olefin and the recycling of diluent from the product recovery zone to the reaction zone. Further, the use of the receiving zone results in an increase in polymer concentration prior to the polymer product recovery zone thereby decreasing the load on said zone. Further, by permitting the reactants to remain in the reaction zone for a longer period of time prior to withdrawal the olefin conversion is increased considerably, thereby resulting in an improved economic climate. Another advantage to this system is that less new diluent is introduced to the reactor thereby decreasing the possibility of the introduction of catalyst poisons into the reactor system. Catalyst productivity is also generally improved with a consequent lower ash content in the product.

By the method of this invention an appendage is attached to the loop reactor in such a manner that the flowing reactants and diluent will continuously pass the entrance to said appendage, herein referred to as a receiving zone, in such a manner that the heavier particles will continuously gravitate from the flowing reactants and diluent into the receiving zone while the lighter diluent and reactants will continually flow across the entrance to said receiving zone thereby resulting in the collection within said receiving zone of a fraction concentrated in particulate polymer solids. This receiving zone may be of any type so long as the entrance thereto is large enough to prevent bridging of the polymer and not so large as to result in an unduly large amount of diluent and reactants being entrapped in the receiving zone. It has been found that the polymer production rate is a function of the settling area, i.e., the diameter of the entrance to the receiving zone. The required length of the receiving zone is also a function of the velocity as well as the inventory of polymer within the receiving zone. For instance, when using a 10 inch I.D. reactor, a 1¼ inch receiving zone, and a reactor velocity of approximately 8 ft./sec., the turbulent zone extends approximately 5½ receiving zone diameters into said receiving zone so the length must extend past this point to provide a zone of relative quiet. When the polymer solids concentration is 20–25 percent within the reactor using a 10–14 ft./sec. linear velocity, the polymer will build up within the zone at an approximate rate of 1 to 2 ft./minute. As illustrated by the attached drawing the receiving zone may consist of a simple tube appended to the lower side of the reaction zone. In the case of a 10 inch I.D. loop reactor the entrance to the receiving zone may be approximately 1 and ¼ inch in diameter. Preferably, the length of the zone will be at least three times the diameter of the receiving zone, more preferably 4 to 40 times. The entrance diameter will be a function of the desired production rate. In general, it is more advantageous to have a multiple number of small diameter receiving zones than a single large diameter unit to increase the flexibility of control over production rate. It would be within the scope of the invention to use other conventional types of settling tanks such as a liquid-solid cyclone, centriclone, centrifuge, etc., or a series of said settling tanks.

In the normal operation of the receiving zone the particles collected therein are in the form of particulate solids. At the lower extremity of the receiving zone may be located a valve which periodically opens and closes completely so as to permit the removal of polymer product. In view of the fact that the loop reactor is operated under superatmospheric pressure and the valve opens into a conduit of approximately atmospheric pressure the hydrocarbon diluent and reactants will be rapidly evaporated and the gases expanded so as to propel the polymer product through the conduit to the product polymer recovery zone. Two valves may be incorporated within the receiving zone permitting the entrapment of a portion of the settled polymer product. Periodically the bottom valve would be closed and the upper valve would open to permit the introduction of polymer product into the lock; then the top valve would close and the bottom valve would open to prevent the escape of the polymer with the small amount of accompanying diluent and reactant. The valve, or the series of valves, are normally fully opened or fully closed and may be operated on a time cycle.

As discussed above the polymer product accumulating in the receiving zone is normally a solid particulate polymer which is easily removed from the receiving zone by the method or methods described above. However, if the timing or the removal of the polymer from the receiving zone is not carefully controlled the reactants which accompany the polymer into the receiving zone have an ideal environment for further polymerization. In view of the fact that the olefin polymerization reaction is normally exothermic the evolved heat results in the fusion of the accumulated polymer product thereby resulting in the agglomeration of said product into a mass which may be difficult to remove from the receiving zone. In one aspect of this invention the heat evolved in the receiving zone is continuously removed so as to prevent the elevation of temperature within the receiving zone to above the fusion point of the polymer product. Any conventional method of removing heat may be utilized such as a heat exchange system, direct or indirect. The fusion problem may also be alleviated by removing the reactants from the receiving zone before they have an opportunity to further polymerize. One suitable method is to inject a diluent into the bottom of the receiving zone thereby cooling said receiving zone. The diluent may range in temperature from ambient temperature to slightly below the reaction zone temperature; for polyethylene, this would be ambient temperature to about 225° F.; more preferably, about 70° F. to about 200° F. If the velocity of the diluent entering the receiving zone from near the bottom is in excess of the velocity of the reactants entering the receiving zone from the loop reaction the reactants will be elutriated back into the loop reactor. It is, of course, essential that the volume of diluent not be excessive and that the velocity be such that the reactants will be removed from the receiving zone but that the particulate solids will be permitted to settle therein. This introduction of a diluent, such as the diluent used in the loop reactor, into the bottom of the receiving zone may be varied in response to a signal from a thermocouple within the receiving zone which measures the temperature of said receiving zone. As the temperature in the receiving zone increases the amount of diluent injected into said receiving zone is increased and vice versa. Any type of conventional temperaure control system may be used such as a Foxboro model 40 recorder controller as described in Foxboro bulletin 5 A–10 Z (1955).

In another aspect of this invention this secondary polymerization reaction is controlled by adjusting the residence time of the polymer product within the receiving zone. This may be accomplished by increasing the withdrawal rate from the polymerization zone. However, this is ordinarily undesirable because it also means the withdrawal of an increased amount of reactants and diluent from the reaction zone thereby negating some of the advantages of the receiving zone.

A preferable method of adjusting the residence time within the receiving zone is by varying the velocity of the reactants and diluent within the reactor zone in direct proportion to the volume of solids within the receiving zone. As the velocity of the diluent and reactants is increased within the loop reactor the amount of particulate solids gravitating from said reaction zone into said receiving zone is thereby decreased, and vice versa. Therefore, any conventional measuring device may be used to determine the volume of solids within the receiving zone which will transmit a signal to the propelling means to adjust the velocity. When using a constant volume receiving zone a simple device for measuring the depth of solids within the receiving zone may be used, such as a gamma ray density gauge or by focusing a light beam through the reactor at the maximum and minimum desired levels. Either means will indicate when the solids depth level is outside the desired range. When using a variable speed motor with propellers to propel the liquid an increase in the depth of the solids within the receiving zone will result in a signal transmission to the variable speed motor to increase the motor speed thereby reducing the depth of settled material in the receiving zone. When the solids depth level reaches the minimum desired point the converse will occur.

The location of the receiving zone with respect to the loop reactor system is not particularly important so long as the particulate solids produced may gravitate into the receiving zone. In the preferred method of operation the receiving zone will be located on the under side of one of the horizontal legs of the reactor so that the direction of flow within the reactor will be perpendicular to the receiving zone.

It is surprising that the utilization of the receiving zone of this invention in conjunction with the loop reaction system will result in the concentration of polymer from the 18–20 percent found within the reactor to approximately 55 percent within receiving zone. These concentrations will vary, of course, with the reactants and the reaction conditions within the reaction zone. It is further surprising that by the utilization of this invention the conversion of the reactants is increased. For example, it has been found that it is possible to increase the ethylene conversion from 50 to 70 percent to approximately 85 to 95 percent. When forming a copolymer of ethylene and 1-butene it has been found that the increase of butene conversion is from 25 percent to approximately 50 percent. Conversion is determined by dividing the amount of product by the amount of monomer introduced into the loop reactor.

The invention is best described by reference to the accompanying drawing.

Reactor 1, which is oblong in shape, is made of flanged straight pipe sections and L's joined together to provide a continuous flow path which is substantially free from obstructions. The reactor is jacketed by section 9 which forms an annular space 10 with the reactor 1. By means of inlet 13 and outlet 14 a heat exchange fluid is permitted to flow through annular space 10 to control the temperature of the reactor. Conduit 2 is provided for the introduction of catalyst and diluent into the reactor and conduit 3 is provided for the introduction of ethylene into the reactor. Conduit 11 and valve 12 are provided for the periodic removal of a reaction sample to ascertain the conditions within the reactor. Thermocouples can be provided for sensing the temperature in the reactor. Provision can be made to transmit the measurement of the reactor temperature to a temperature recorder controller (not shown) which can be utilized to control the reactor temperature. Various control methods can be used including control of the heat exchange fluid to jacket 9, control of the quantity and/or temperature of reactants entering the reactor, control of the amount of catalyst entering the reactor, etc. Vertically disposed drive shaft 4 connects to propellers 5 and 6. Suitable means can be provided outside the reactor, such as variable speed motor 8, for actuating the drive shaft 4 and propellers 5 and 6. Considerable agitation is produced by propellers 5 and 6 and this is converted in part to flow energy by providing straightening vanes 7, formed by metal plates projecting perpendicularly from the inner wall of the reactor and positioned adjacent to propellers 5 and 6. Any suitable means may be used to convert rotational energy to flow energy.

In the apparatus shown the vertical leg in which the propellers are positioned is of substantially the same cross section as the remainder of the reactor, however, if desired, the vertical leg may be of larger or smaller diameter than the remainder of the reactor. The various parts which make up the reactor are constructed to provide a smooth, continuous, inner surface presenting a minimum of obstruction to flow. The only obstructions of any consequence in the reactor are the propellers 5 and 6 and straightening vanes 7. The reactor may be made up of flanged sections or partially or completely welded.

The receiving zone, as shown in the drawing, consists of a pipe welded directly onto the reactor outside wall and extending through the heat exchange jacket thereby establishing open communication with the reactor at 15. This section terminates in a flange 16 through which the receiving zone 17 protrudes from the reactor to some distance below the reactor thereby forming a receiving chamber or zone. In the case of a 95 gallon reactor having a 10 inch internal diameter, this receiving zone can be a 1¼ inch I.D. pipe some 43 inches in length welded to said reactor. The size of the opening the size of the pipe and the capacity of the receiving zone will be varied within considerable limits to fit the conditions of operation. At the terminus of receiving zone 17 is located a valve 18 which is periodically in the completely open or the completely closed position. The valve port may be a slot, for instance, ⅜ inch by 1¼ inch or a simple round opening, such as ⅜ inch in diameter. A suitable method of activating the valve is by the use of a 5¾ inch stroke Rivett air cylinder. From the valve 18 the product and the diluent and reactants are transported by the expanding gases via conduit 19 to the product recovery zone.

Within the receiving zone 17 the temperature is sensed by a thermocouple 23 which transmits a signal to temperature recorder controller 22 which activates motor valve 21 in conduit 20 to permit the introduction of diluent into receiving zone 17 thereby cooling the contents thereof and, if desired, elutriating the reactants back into the reactor 1.

By means of solids depth level sensing means 24 and 25, which can be photoelectric type devices or gamma ray density gauges, etc., a signal is transmitted to level controller 26 when the depth of solids is outside the range desired as predetermined by the arrangement of sensing means 24 and 25. This signal is then transmitted to the variable speed motor 8 for propelling the propellers 5 and 6 thereby increasing or decreasing the velocity of fluid within the reactor. When the level within the receiving zone 17 increases to above a predetermined level, a signal is transmitted to variable speed motor 8 so as to increase the rotational energy imparted to the propellers 5 and 6 thereby increasing the velocity of the fluid within the reactor, and vice versa. A safety valve may be incorporated in receiving zone 17 upstream of valve 18 with said safety valve being normally open so that in the result of a failure of valve 18 to close properly the safety valve will be actuated to close so as to prevent the loss of reactants and diluent.

The expanding gases resulting from the decrease in pressure from superatmospheric pressure to substantially atmospheric pressure in conduit 19 transport the reactants and diluent and product to the product recovery zone. This product recovery zone may include a dryer which may be a flash dryer to remove primary gases or a fluidized bed dryer, etc. For instance, when a copolymer of ethylene and 1-butene is being produced by the use of a pentane diluent with a chromium oxide catalyst the contents of line 19 will comprise polymer product, gaseous pentane, and gaseous ethylene and 1-butene. The catalyst will be intimately associated with the polymer and will not ordinarily be separated therefrom. There will be a minimum amount of liquid at these essentially atmospheric conditions. From dryer 27 dry polymer will be removed through conduit 28 for packaging or further processing. Conduit 29 will transport the removed gases which will contain "polymer fines" which may be removed in a filter such as bag-filter 30. These polymer fines may then be further processed, returned to the dryer or discarded through conduit 45. The gases passing through the filter will be transported through conduit 40 into condenser 41 which will condense at least part of the gaseous components. The condensate will be removed through conduit 43 or returned to the reactor 9 or for further processing. The gases will be transported through conduit 42 to a flare for burning or returned to the reactor 9.

While the drawings have illustrated propeller means for imparting flow to the reactor contents it is within the scope of the invention to provide other types of motive power. For example, the propellers can be replaced by a pump of the impeller type. With a suitably designed pump, namely one which provides a maximum of flow energy, it is possible to reduce or entirely eliminate the use of straightening vanes in the reactor. Any conventional driver including a motor, turbine, etc., can be utilized for actuating the propellers, pump or other motive means provided for moving the reactor contents.

The following data are presented to illustrate the invention.

Monomers of ethylene and butene-1 were introduced into a loop reactor of the type shown in the drawing. The loop reactor had a uniform 10 inch internal diameter, except the section housing the impeller which had a 12 inch I.D. The receiving zone which was appended to the lower portion of the lower horizontal leg of the reactor comprised a 1¼ inch I.D. pipe some 43 inches in length which was welded directly to the reactor and in open communication with the interior thereof. Two runs were made to compare the efficiency of the loop reactor without a settling leg or receiving zone using valve 12 and conduit 11 to continuously withdraw polymer and with a receiving zone 17. The following data compare the operating conditions and the results of those two runs and are presented in illustration of the invention:

EXAMPLE

|  | With Receiving Zone | Without Receiving Zone |
|---|---|---|
| Loop Reactor Conditions: | | |
| Capacity, gal | 95 | 95 |
| Pressure, p.s.i.g | 450 | 450 |
| Reaction Temperature (44) °F | 205 | 205 |
| Coolant Temperature, °F.: | | |
| In (13) | 190 | 177 |
| Out (14) | 194 | 184 |
| Loop Reactor Influent, lbs./hr.: | | |
| Ethylene (3) | 21 | 39 |
| Butene-1 (3) | 0.5 | 0.8 |
| Pentane (2) | 15.75 | 99.0 |
| Chromium oxide catalyst (2) | 0.008 | 0.008 |
|  | 37.258 | 138.808 |
| Dryer Influent (19), lbs./hr.: | | |
| Ethylene | 1.25 | 19.1 |
| Butene-1 | 0.25 | 0.7 |
| Pentane | 15.75 | 99.0 |
| Catalyst | 0.008 | 0.008 |
| Polymer | 20.0 | 20.0 |
|  | 37.258 | 138.808 |
| Efficiency: | | |
| Percent Solids in dryer influent (19) | 53.7 | 14.4 |
| Ethylene Conversion, percent | 94 | 51 |
| Butene-1 Conversion, percent | 50 | 25 |
| Dryer (27) Duty, B.t.u./lb. of polymer | 88 | 555 |
| Polymer Properties: | | |
| High Load Melt Index [1] | 5.28 | 1.99 |
| Density, gms./cc.[2] | 0.937 | 0.951 |
| Ash, wt. percent | 0.04 | 0.04 |

[1] The method of ASTM D-1238-52T was used except that the polymer sample is allowed to extrude from the test apparatus for 9 minutes at which time the extrudate is cut off with a spatula. The extrudate is cut off again at the end of 11 minutes. The 9 to 11 minute cut is weighed. This weight is multiplied by 5 and reported as the melt index value. This test is run under high load conditions (21,600 gms.).

[2] Density as used herein is determined by compression molding a slab of the polymer, cooling molding at a temperature reduction rate of 15 to 20° F. per minute to room temperature, cutting a pea-sized specimen therefrom, and placing said specimen in a 50-ml. glass-stoppered graduate. Carbon tetrachloride and methyl cyclohexane are added to the graduate from burettes in proportion such that the specimen is suspended in the solution. During the addition of the liquids the graduate is shaken to secure thorough mixing. When the mixture just suspends the specimen, a portion of the liquid is transferred to a small test tube and placed on the platform of a Westphal balance and the glass bob lowered therein. With the temperature shown by the thermometer in the bob in the range 73 to 78° F., the balance is adjusted until the pointer is at zero. The value shown on the scale is taken as the specific gravity.

As can be seen from the above tabulation the efficiency of the loop reactor is greatly improved by the use of the settling leg of this invention.

While certain examples, structures, composition and process steps have been described for purposes of illustration, the invention is not limited to these. Variation and modification within the scope of the disclosure and the claims can readily be effected by those skilled in the art.

What I claim is:

1. In a process for the polymerization of a 1-olefin by contacting said 1-olefin with a catalyst and a diluent within a smooth continuous path reaction zone at a temperature and pressure such that substantially all the diluent is in the liquid phase and the polymer produced is insoluble in said diluent and is in the form of solid particulate polymer having a density greater than said diluent, said polymer, catalyst, 1-olefin and diluent being continuously moved through said continuous path reaction zone at a velocity in the highly turbulent flow range, the improvement which comprises removing said particulate solids from said zone by causing said particulate solids to gravitate from said reaction zone into a receiving zone thereby collecting a fraction concentrated in product polymer solids while substantially all the diluent, 1-olefin and catalyst continue to flow across the entrance to the receiving zone and remain within said reaction zone and withdrawing said fraction from said receiving zone.

2. In a process for the polymerization of a 1-olefin by contacting said 1-olefin with a catalyst and a diluent within a smooth continuous path reaction zone at a temperature and pressure such that substantially all the diluent is in the liquid phase and the polymer produced is insoluble and suspended in said diluent and is in the form of solid particulate polymer having a density greater than said diluent, said polymer, catalyst, 1-olefin and diluent being continuously moved through said continuous path reaction zone at a velocity in the highly turbulent flow range, the improvement which comprises removing said particulate solids from said zone by causing said particulate solids to continuously gravitate from said reaction zone into a receiving zone in open communication with said reaction zone thereby collecting, by settling, a fraction concentrated in product polymer while substantially all the diluent, 1-olefin and catalyst continue to flow across the entrance to the receiving zone and remain within said reaction zone, introducing sufficient diluent into said receiving zone to maintain the temperature of said particulate polymer below the softening point of said polymer and withdrawing said product polymer fraction from said receiving zone.

3. The process of claim 2 wherein the volume of diluent introduced into said receiving zone is varied directly proportional to temperature changes within the receiving zone.

4. The process of claim 2 wherein the velocity of upwardly flowing diluent within the receiving zone is sufficient to elutriate at least part of the reactants back into the reaction zone but is not great enough to prevent the settling of the desired polymer product particles.

5. In a process for the polymerization of a 1-olefin by contacting said 1-olefin with a catalyst and a diluent within a smooth continuous path reaction zone at a temperature and pressure such that substantially all the diluent is in the liquid phase and the polymer produced is insoluble and suspended in said diluent and is in the form of solid particulate polymer having a density greater than said diluent, said polymer, catalyst, 1-olefin and diluent being continuously moved through said continuous path reaction zone at a velocity in the highly turbulent flow range, the improvement which comprises removing said particulate solids from said zone by causing said particulate solids to continuously gravitate from said reaction zone into a receiving zone in open communication with said reaction zone thereby collecting by settling a fraction concentrated in product polymer while substantially all the diluent, 1-olefin and catalyst continue to flow across the entrance to the receiving zone and remain within said reaction zone, varying the flow rate of the reactants within said reaction zone directly proportional to the quantity of particulate solids contained in said receiving zone thereby maintaining a substantially constant residence time for polymer within said receiving zone and withdrawing said polymer product fraction from said receiving zone.

6. The method of claim 5 wherein the flow rate is varied directly proportional to the depth of particulate solids within the receiving zone.

7. In a process for the polymerization of a 1-olefin by contacting said 1-olefin with a catalyst and a diluent within a smooth continuous path reaction zone in turbulent flow at a temperature and pressure such that substantially all the diluent is in the liquid phase and the polymer produced is insoluble and suspended in said diluent and is in the form of solid particulate polymer having a density greater than said diluent, said polymer, catalyst, 1-olefin and diluent being continuously moved through said continuous path reaction zone at a velocity in the highly turbulent flow range, the improvement comprising removing said particulate solids from said zone by causing said particulate solids to continuously gravitate from said reaction zone into a receiving zone in open communication with said reaction zone thereby collecting by settling a fraction concentrated in product polymer while substantially all the diluent, 1-olefin and catalyst continue to flow across the entrance to the receiving zone and remain within said reaction zone, introducing sufficient diluent into said receiving zone to maintain the temperature of said particulate solids below the softening point of said polymer, varying the flow rate of the reactants within said reaction zone directly proportional to the quantity of particulate solids contained in said receiving zone thereby maintaining a substantially constant residence time for polymer within said receiving zone and withdrawing said polymer product fraction from said receiving zone.

8. The process of claim 7 wherein the velocity of the upwardly flowing diluent within the receiving zone is sufficient to elutriate at least part of the reactants back into the reaction zone but is not great enough to prevent the settling of the desired polymer product polymers.

9. The process of claim 7 wherein the volume of diluent introduced into said receiving zone is varied directly proportional to temperature changes within the receiving zone and the flow rate within the reaction zone is varied directly proportional to the depth of particulate solids within said receiving zone.

10. In a process for the polymerization of ethylene by contacting said ethylene with a chromium oxide catalyst containing hexavalent chromium associated with an oxide selected from the group consisting of silica, alumina, thoria and zirconia in liquid normal pentane within a vertically disposed smooth closed continuous path reaction zone of uniform cross-section and at a temperature in the range of between 225° F. and about 150° F. and a temperature such that substantially all the diluent is in the liquid phase whereby substantially all the polyethylene product is insoluble and suspended in said liquid normal pentane and is in the form of solid particles of polyethylene, said polyethylene, catalyst, normal pentane and ethylene being continuously moved through said continuous path reaction zone at a velocity in the highly turbulent range, the improvement which comprises removing said particulate solids from said zone by causing said particulate solids to gravitate from said reaction zone into a receiving zone in open communication with said reaction zone thereby collecting by settling a fraction concentrated in product polyethylene while substantially all the diluent, 1-olefin and catalyst continue to flow across the entrance to the receiving zone and remain within said reaction zone, introducing sufficient diluent into said receiving zone to maintain the temperature of said particulate polyethylene below the softening point of said polyethylene, varying the flow rate of the reactants within said reaction zone directly proportional to the quantity of particulate solids contained within said receiving zone thereby maintaining a substantially constant residence time for product within said receiving zone and withdrawing said polyethylene from said receiving zone.

11. The process of claim 10 wherein the volume of diluent introduced into said receiving zone is varied directly proportional to temperature changes within the said receiving zone and wherein said flow rate within the reaction zone is varied directly proportional to the depth of particulate solids within the receiving zone.

12. A process for the copolymerization of ethylene and 1-butene by contacting ethylene and 1-butene with a chromium oxide catalyst containing hexavalent chromium associated with an oxide selected from the group consisting of silica, alumina, thoria, and zirconia in liquid normal pentane within a vertically disposed smooth closed continuous path reaction zone of uniform cross-section and at a temperature in the range of between 225° F. and about 150° F. and a temperature such that substantially all the diluent is in the liquid phase wherein substantially all of the particle form copolymer produced is insoluble and suspended in said liquid normal pentane and is in the form of solid particles of ethylene-1-butene copolymer, said copolymer, catalyst, normal pentane, ethylene and 1-butene being continuously moved through said continuous path reaction zone at a velocity in the highly turbulent flow range, the improvement which comprises removing said particulate solids from said zone by causing said particulate solids to gravitate from said reaction zone into a receiving zone in open communication with said receiving zone thereby collecting by settling the fraction concentrated in product copolymer while substantially all the diluent, 1-olefin and catalyst continue to flow across the entrance to the receiving zone and remain within said reaction zone, introducing sufficient diluent into said receiving zone to maintain the temperature of said particulate copolymer below the softening point, varying the flow rate of the reactants within said reaction zone directly proportional to the quantity of particulate solids contained within said receiving zone thereby maintaining a substantially constant residence time for copolymer within said receiving zone and withdrawing said copolymer from said receiving zone.

13. The process of claim 12 wherein the volume of diluent introduced into said receiving zone is varied directly proportional to temperature changes within said receiving zone and wherein said flow rate within the reaction zone is varied directly proportional to the depth of particulate solids within the receiving zone.

14. In a process for the polymerization of a 1-olefin by contacting said 1-olefin with a catalyst and a diluent within a smooth continuous path reaction zone in turbulent flow at a temperature and pressure such that substantially all the diluent is in the liquid phase and the polymer produced is insoluble in said diluent and is in the form of solid particulate polymer having a density greater than said diluent, the improvement which comprises removing said particulate solids from said zone by causing said particulate solids to gravitate from said reaction zone into a receiving zone thereby collecting a fraction concentrated in product polymer solids while substantially all the diluent, 1-olefin and catalyst continue to flow across the entrance to the receiving zone and remain within said reaction zone, reducing polymer agglomeration within said receiving zone by adjusting a process variable affecting secondary polymerization within said receiving zone, and withdrawing said fraction from said receiving zone.

15. Apparatus comprising in combination a tubular closed reactor with smooth bends, said reactor being substantially free from internal obstructions; means for introducing olefin reactant, polymerization catalyst and liquid hydrocarbon diluent into said reactor; means for continuously moving the contents of said reactor therethrough at a velocity in the turbulent flow range; receiving means comprising a vertically disposed appendage on a lower portion of a horizontal leg of said reactor establishing open communication with said reactor for continuously receiving particulate polymer solids gravitating from said reactor thereby producing a fraction concentrated in particulate solids; cooling means for maintaining the temperature of said particulate solids within said receiving means below the softening point of the polymer and means for withdrawing said fraction from said receiving means.

16. The apparatus of claim 15 wherein said cooling means comprises means for the injection of a diluent into said receiving means.

17. Apparatus comprising in combination a tubular closed reactor with smooth bends, said reactor being substantially free from internal obstructions; means for introducing olefin reactant, polymerization catalyst and liquid hydrocarbon diluent into said reactor; means for continuously moving the contents of said reactor therethrough at a velocity in the turbulent flow range; receiving means comprising a vertically disposed appendage on a lower portion of a horizontal leg of said reactor establishing open communication with said reactor for continuously receiving particulate polymer solids gravitating from said reactor thereby producing a fraction concentrated in particulate solids; cooling means for maintaining the temperature of said particulate solids within said receiving means below the softening point of the polymer; temperature sensing means for determining the temperature within said receiving means; means connecting said temperature sensing means and said cooling means for varying the cooling in response to a variation in temperature within said receiving means and means for withdrawing said fraction from said receiving means.

18. Apparatus comprising in combination a tubular closed reactor with smooth bends, said reactor being substantially free from internal obstructions; means for introducing olefin reactant, polymerization catalyst and liquid hydrocarbon diluent into said reactant; means for continuously moving the contents of said reactor therethrough at a velocity in the tubulent flow range; receiving means comprising a vertically disposed appendage on a horizontal leg of said reactor establishing open communication with said reactor for continuously receiving particulate polymer solids gravitating from said reactor thereby producing a fraction concentrated in particulate solids; measuring means for sensing the quantity of particulate solids contained in said receiving means; means for varying the velocity of reactants within said loop reactor; means for varying said velocity in response to a signal from said measuring means so as to maintain a substantially constant residence time for polymer within said receiving zone and means for withdrawing polymer product from said receiving means.

19. The apparatus of claim 18 wherein said measuring means is a solids depth sensing device.

20. Apparatus comprising in combination a tubular closed reactor with smooth bends, said reactor being substantially free from internal obstructions; means for introducing olefin reactant, polymerization catalyst and liquid hydrocarbon diluent into said reactor; means for continuously moving the contents of said reactor therethrough at a velocity in the turbulent flow range; receiving means comprising a vertically disposed appendage on a horizontal leg of said reactor establishing open communication with said reactor for continuously receiving particulate polymer solids gravitating from said reactor thereby producing a fraction concentrated in particulate solids; cooling means for maintaining the temperature of the particulate solids within said receiving means below the softening point of the polymer; measuring means for sensing the quantity of particulate solids contained in said receiving means; means for varying the velocity of reactants within said reactor; means for varying said velocity in response to a signal from said measuring means so as to maintain a substantially constant residence time for polymer within said receiving zone and means for withdrawing polymer product from said receiving means.

21. The apparatus of claim 20 wherein said cooling means comprises the injection of a diluent into said receiving means and wherein said measuring means is a solids depth sensing device.

References Cited by the Examiner

UNITED STATES PATENTS

| 2,330,118 | 9/1943 | Frey | 196—2 |
| 2,376,833 | 5/1945 | Teter | 208—153 |
| 2,825,721 | 3/1958 | Hogan et al. | 260—88.1 |
| 2,885,389 | 5/1959 | Schappert | 260—94.9 |
| 2,908,734 | 10/1959 | Cottle | 260—94.9 |

FOREIGN PATENTS

| 550,088 | 10/1956 | Belgium. |
| 1,172,905 | 2/1959 | France. |

JOSEPH L. SCHOFER, *Primary Examiner.*

MARK LIEBMAN, JOSEPH LIBERMAN, W. SHORT,
*Examiners.*